(12) United States Patent  
Chen et al.

(10) Patent No.: US 9,038,530 B2  
(45) Date of Patent: May 26, 2015

(54) BEVERAGE BREWING APPARATUS WITH PUMP DISPENSING SYSTEM

(75) Inventors: Andrew Yuen Chin Chen, Tai Po (HK); Amy Decem Cheng, Tai Po (HK); Kwan Fai Lui, Tai Po (HK)

(73) Assignee: ENE HOLDINGS LTD, Hong Kong (CN)

( * ) Notice: Subject to any disclaimer, the term of this patent is extended or adjusted under 35 U.S.C. 154(b) by 1670 days.

(21) Appl. No.: 11/750,036

(22) Filed: May 17, 2007

(65) Prior Publication Data

US 2008/0282896 A1 Nov. 20, 2008

(51) Int. Cl.
*A47J 31/40* (2006.01)
*A47J 31/057* (2006.01)
*A47J 31/46* (2006.01)

(52) U.S. Cl.
CPC .............. *A47J 31/46* (2013.01); *A47J 31/0573* (2013.01); *A47J 31/467* (2013.01)

(58) Field of Classification Search
CPC ...... A47J 31/467; A47J 31/46; A47J 31/0573
USPC ............... 99/279, 289 R, 280, 300, 295, 293, 99/301–307, 316; 222/95, 129.1; 426/431, 426/433
See application file for complete search history.

(56) References Cited

U.S. PATENT DOCUMENTS

| | | | | |
|---|---|---|---|---|
| 2,248,077 A * | 7/1941 | Harris | ............................ | 210/255 |
| 3,034,417 A * | 5/1962 | Bunn | ............................... | 99/283 |
| 3,141,793 A * | 7/1964 | Oliphant | ........................ | 118/300 |
| 3,184,221 A * | 5/1965 | Mould, Jr. | ...................... | 366/302 |
| 3,220,334 A * | 11/1965 | Martin | ............................. | 99/282 |
| 3,575,536 A * | 4/1971 | Jacobs et al. | .................. | 417/420 |
| 3,744,764 A * | 7/1973 | Sedam | .......................... | 366/250 |
| 3,888,466 A * | 6/1975 | Sedam | .......................... | 222/394 |
| 3,985,272 A * | 10/1976 | Rodth | ........................... | 222/205 |
| 4,083,295 A * | 4/1978 | Hollingsworth | ................. | 99/283 |
| 4,138,936 A * | 2/1979 | Williams | ........................ | 99/282 |
| 4,139,125 A * | 2/1979 | Arzberger et al. | .......... | 222/129.4 |
| 4,324,494 A * | 4/1982 | Pryor et al. | ................. | 366/156.1 |
| 4,366,920 A * | 1/1983 | Greenfield et al. | ......... | 222/145.5 |
| 4,382,402 A * | 5/1983 | Alvarez | .......................... | 99/295 |

(Continued)

FOREIGN PATENT DOCUMENTS

CN 101199394 A 6/2008
DE 20116040 U1 2/2002

(Continued)

OTHER PUBLICATIONS

Written Opinion and International Search Report dated Dec. 25, 2008.

(Continued)

*Primary Examiner* — Brett Spurlock
(74) *Attorney, Agent, or Firm* — Law Offices of Albert Wai-Kit Chan, PLLC (57) ABSTRACT

A beverage machine for preparing and dispensing a hot beverage having a pump dispensing system. Hot water passes through a water distributor to infuse material in a filter basket. A coffee tank receives the brewed beverage and maintains it at an appropriate temperature. On demand, a pump dispensing system delivers the beverage through an outlet chamber and spout into a user's cup. The user manipulates a switch to vary the rate at which the pump dispensing system dispenses the beverage.

11 Claims, 8 Drawing Sheets

(56) References Cited

U.S. PATENT DOCUMENTS

| | | | | |
|---|---|---|---|---|
| 4,448,113 A * | 5/1984 | Brabon | | 99/290 |
| 4,480,767 A * | 11/1984 | Brown | | 222/340 |
| 4,490,335 A * | 12/1984 | Marev et al. | | 422/269 |
| 4,512,377 A * | 4/1985 | Greer | | 141/11 |
| 4,566,287 A * | 1/1986 | Schmidt et al. | | 62/188 |
| 4,620,953 A * | 11/1986 | Silla et al. | | 261/142 |
| 4,641,011 A * | 2/1987 | Roberts | | 392/451 |
| 4,653,281 A * | 3/1987 | Van Der Veer | | 62/71 |
| 4,745,852 A * | 5/1988 | Sager | | 99/280 |
| 4,858,523 A * | 8/1989 | Helbling | | 99/280 |
| 4,916,910 A * | 4/1990 | Schroeder | | 62/59 |
| 4,917,005 A * | 4/1990 | Knepler | | 99/280 |
| 4,964,542 A * | 10/1990 | Smith | | 222/146.6 |
| 5,073,312 A * | 12/1991 | Burrows | | 261/140.1 |
| 5,080,008 A * | 1/1992 | Helbling | | 99/280 |
| 5,094,153 A * | 3/1992 | Helbling | | 99/280 |
| 5,265,318 A * | 11/1993 | Shero | | 29/447 |
| 5,283,854 A * | 2/1994 | Schiebelhuth | | 392/467 |
| 5,473,972 A * | 12/1995 | Rizzuto et al. | | 99/290 |
| 5,671,325 A * | 9/1997 | Roberson | | 392/442 |
| 5,782,163 A * | 7/1998 | Chang | | 99/281 |
| 5,797,313 A * | 8/1998 | Rothley | | 99/483 |
| 5,836,482 A * | 11/1998 | Ophardt et al. | | 222/325 |
| 5,931,343 A * | 8/1999 | Topar et al. | | 222/56 |
| 5,970,847 A * | 10/1999 | Saltzman | | 99/287 |
| 6,067,894 A * | 5/2000 | Eugster | | 99/285 |
| 6,246,831 B1 * | 6/2001 | Seitz et al. | | 392/486 |
| 6,253,028 B1 * | 6/2001 | Roberson | | 392/442 |
| 6,439,105 B1 * | 8/2002 | Ford | | 99/280 |
| 6,459,854 B1 * | 10/2002 | Yoakim et al. | | 392/479 |
| 6,460,735 B1 * | 10/2002 | Greenwald et al. | | 222/146.1 |
| 6,474,221 B2 * | 11/2002 | Shaanan et al. | | 99/289 R |
| 6,681,960 B2 * | 1/2004 | Garman | | 222/189.11 |
| 6,964,222 B1 * | 11/2005 | Tucker | | 99/281 |
| 7,021,197 B2 * | 4/2006 | Chen et al. | | 99/291 |
| 7,108,156 B2 * | 9/2006 | Fox | | 222/129.1 |
| 7,257,321 B2 * | 8/2007 | Kaastra | | 392/459 |
| 2004/0217137 A1 * | 11/2004 | Ophardt | | 222/481.5 |
| 2005/0011364 A1 * | 1/2005 | Chen et al. | | 99/275 |
| 2005/0103203 A1 | 5/2005 | Takizawa | | |
| 2005/0284302 A1 * | 12/2005 | Levin | | 99/275 |
| 2006/0037481 A1 * | 2/2006 | Bicht | | 99/279 |
| 2006/0144856 A1 * | 7/2006 | Drennow | | 222/95 |
| 2006/0292012 A1 * | 12/2006 | Brudevold et al. | | 417/53 |
| 2009/0178569 A1 * | 7/2009 | Tucker et al. | | 99/282 |

FOREIGN PATENT DOCUMENTS

| | | |
|---|---|---|
| JP | 2-111328 A | 4/1990 |
| JP | 8-89407 A | 9/1996 |
| JP | 2003-47560 A | 2/2003 |
| JP | 2003047560 A | 2/2003 |

OTHER PUBLICATIONS

Oct. 22, 2013 European Search Opinion, EP Appl. No. 08807085.9.
Oct. 22, 2013 Supplemental European Search Report, EP Appl. No. 08807085.9.
Jan. 31, 2014 Examiners Report, CA Appl. No. 2,687,193.
Nov. 30, 2010 First Office Action, CN Appl. No. 200880016378.3.

* cited by examiner

BEVERAGE BREWING APPARATUS WITH PUMP DISPENSING SYSTEM

BACKGROUND OF THE INVENTION

1. Field of the Invention

This invention relates to an apparatus for brewing a beverage and more specifically to such apparatus with improved beverage dispensing characteristics.

2. Description of Related Art

Various types of apparatus exist for brewing hot beverages such as tea and coffee. One example is a drip-type coffee brewing apparatus that, in its basic form, directs heated water onto infusible coffee grounds in a filter basket to brew multiple servings of coffee. A carafe receives the hot beverage. The carafe may comprise a Dewar container or a glass carafe that sits on a warming plate to maintain the beverage at an appropriate temperature. A consumer pours a single serving from the carafe into a cup or mug. After use, normal cleanup requires washing of the carafe and the filter basket. Sometimes during use, coffee drips from the carafe or the filter basket onto the warming plate where it dries into an unsightly and malodorous deposit that requires additional cleaning.

Recently a number of manufacturers have introduced single-serving coffee brewing apparatus that eliminates the need for a carafe and the attendant steps of removing the carafe from the brewing apparatus, pouring an individual serving of the beverage into a cup and replacing the carafe with any remaining beverage in the brewing apparatus. Eliminating the carafe also minimizes occurrences of spilling and splashing on clothing. Thus, it is desirable in the beverage brewing art to provide a drip-type hot beverage brewing device that may automate the dispensing process and avoid the above-mentioned drawbacks to conventional drip-type apparatus using carafes.

U.S. Pat. No. 6,681,960 (2004) to Garman discloses a coffee brewing machine that brews multiple servings and dispenses coffee in single servings thereby eliminating the need for a carafe. A stand has a recess for receiving a portion of a coffee cup. A water reservoir and a brewed beverage tank attach to the top of the stand. The brewed beverage tank includes a filter basket at the top and a reservoir in the bottom. In use, multiple servings of brewed coffee accumulate in the beverage reservoir. When a coffee cup is placed in the receptacle, it displaces a pushbutton that, through a mechanical linkage, opens a valve to dispense a single serving.

With this design, both the brewing tank and water reservoir are above the stand providing a beverage maker that has a high center of gravity. The dispensing actuator is placed under the brewing tank outlet. This presents a possibility of errant spills or drips striking an individual's hand while a cup is being filled, especially because the individual must use the cup to displace the pushbutton against the forces a return spring and linkage friction exert until the desired amount of beverage has been dispensed. The individual must also pay attention during this operation while filling an individual cup because it is possible to dispense more than a cup at a time. This places another demand on an individual's attention.

In addition, the stand height determines the maximum cup height. That is, a cup must lie between the brewing tank and the bottom of the base unit. Any desire to limit the stand height may constrain the variety of cups that can be used with the coffee machine of U.S. Pat. No. 6,681,960. For example, for a given stand height, it may be possible to accommodate a conventional coffee cup, but preclude the use of a tall travel mug. Adapting such a coffee machine to accommodate a tall travel mug could increase the height to an unacceptable level and extend the distance from an outlet spout to a standard coffee cup to an unacceptable distance.

These demands and limitations increase complexity of use. Consequently, apparatus that incorporates the features of the above-mentioned coffee machine will not be user-friendly. Therefore what is needed is hot beverage brewing apparatus for making multiple servings of a beverage and facilitating the use of that apparatus by enabling individuals to dispense single servings. More specifically what is needed is a user friendly, hot beverage brewing apparatus that minimizes an individual's attention demands, eliminates the need for a carafe or the like and is relatively compact.

SUMMARY

Therefore it is an object of this invention to provide a user friendly hot beverage brewing apparatus for brewing multiple servings of a hot beverage and for dispensing the brewed beverage in individual servings.

Another object of this invention is to provide hot beverage brewing apparatus for brewing multiple servings and for dispensing individual servings that is easy to use and to clean.

Yet another object of this invention is to provide a multiple serving hot beverage brewing apparatus that minimizes an individual's involvement in dispensing a single serving of the hot beverage.

Still another object of this invention is to provide a multiple serving hot beverage brewing apparatus that enables an individual to dispense an individual serving without a requirement for continually monitoring the dispensing progress.

Still yet another object of this invention is to provide a multiple serving hot beverage brewing apparatus that eliminates the need for a carafe for receiving the entire output of a brewing operation.

Yet still another object of this invention is to provide a multiple serving hot beverage brewing apparatus that is compact and stable during use.

Another object of this invention is to provide a multiple serving hot beverage brewing apparatus that allows beverage to be dispensed into cups of different heights.

Yet other object of this invention is to provide a reliable multiple serving hot beverage brewing apparatus that facilitates the dispensing of individual servings that is economical to manufacture.

In accordance with this invention, a brewing apparatus for a hot beverage delivered to a dispensing spout includes a base. A filter basket assembly mounts to the base and receives hot water to infuse an extractable substance thereby to produce a hot beverage that is delivered to a beverage tank mounted on the base and below the filter basket assembly to accumulate the hot beverage during the brewing process. A dispensing pump assembly with an impeller in the hot beverage tank displaces the beverage through a dispensing spout to an individual's cup.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
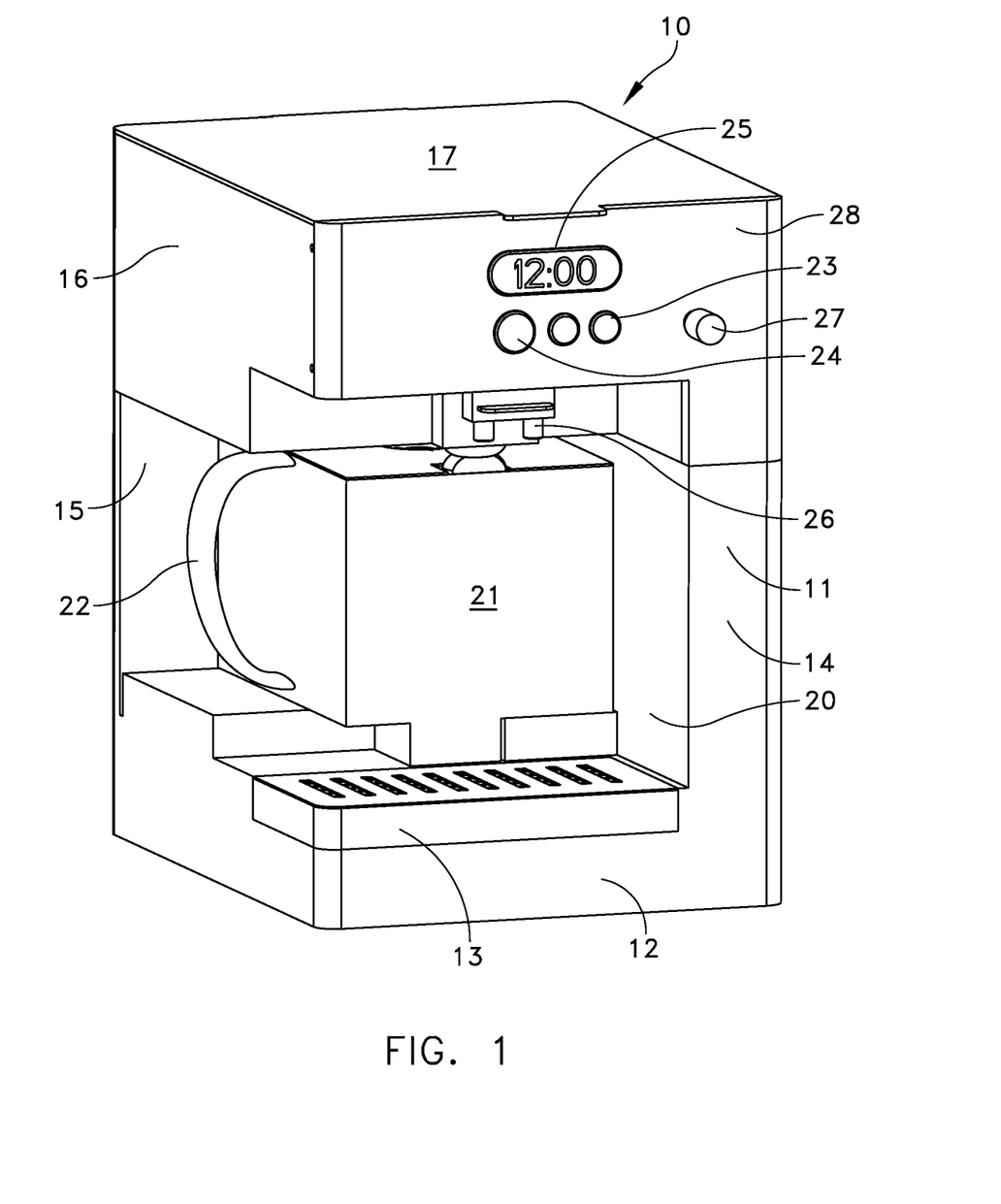
FIG. 1 is perspective view of one embodiment of a brewing apparatus that incorporates the present invention in the form of a coffee brewing machine with a covering lid in a closed position and a beverage tank assembly in place.
Figure 2:
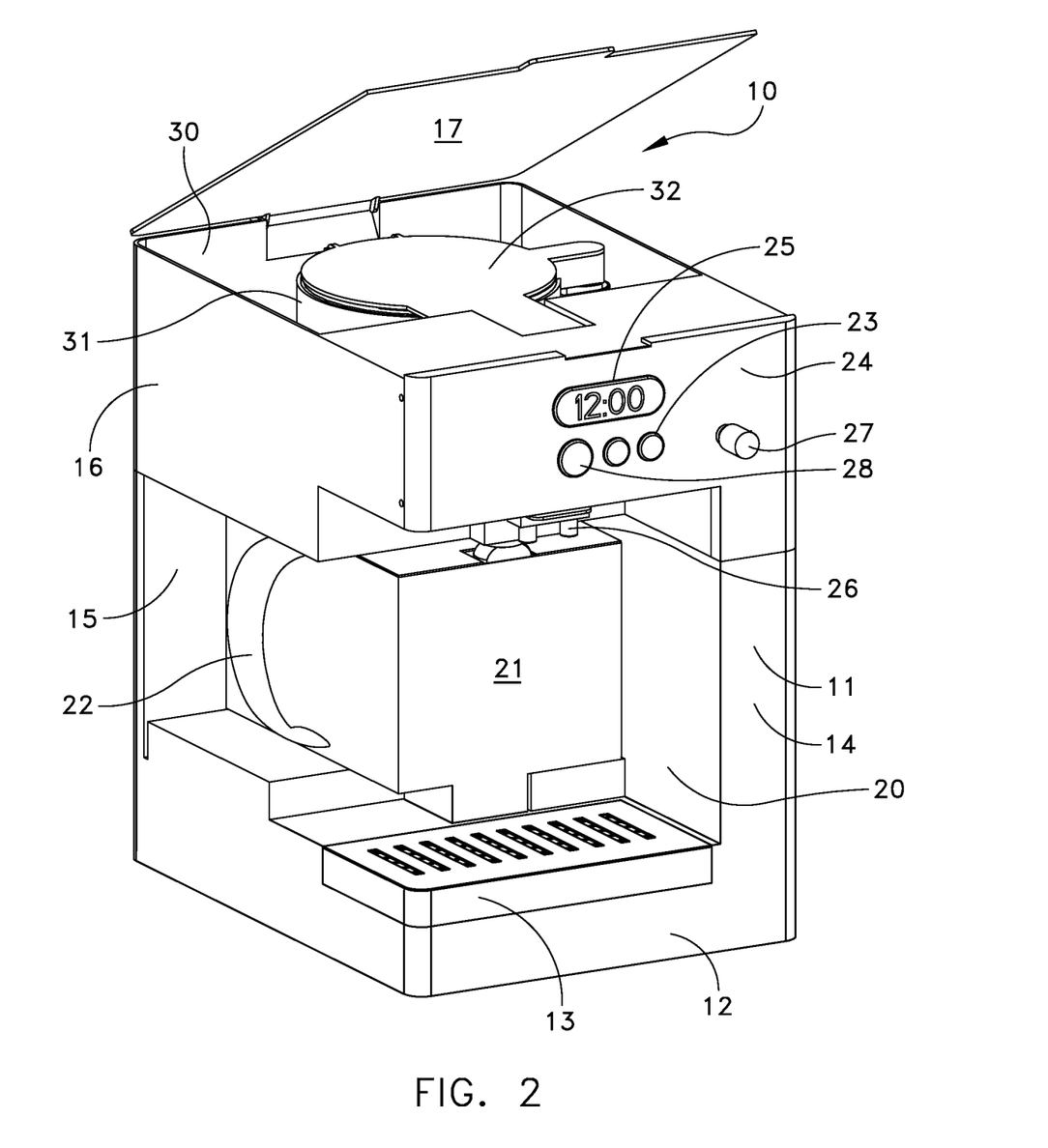
FIG. 2 is perspective view of the coffee brewing machine of FIG. 1 with the covering lid in an open position.
Figure 3:
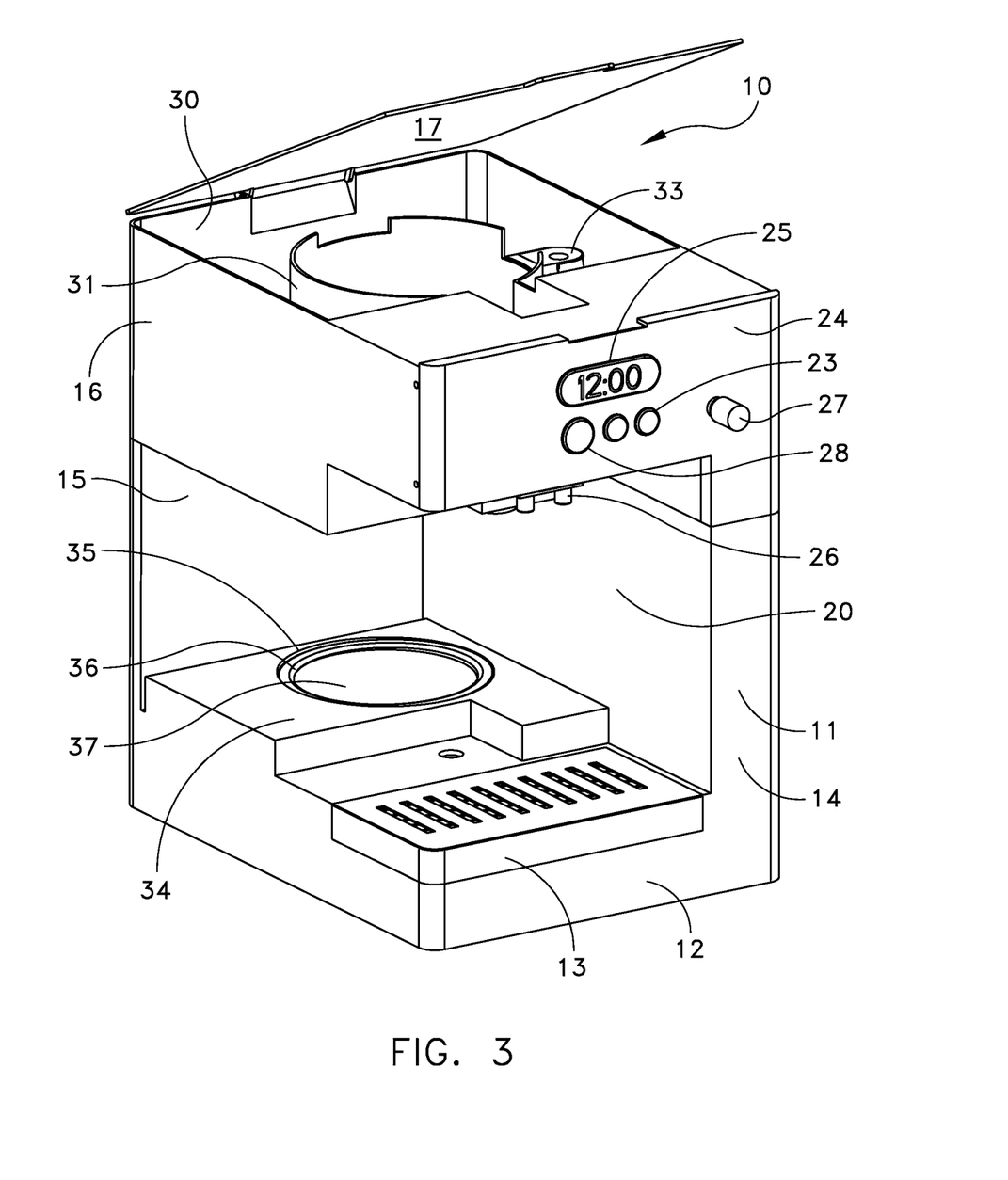
FIG. 3 is perspective view of the coffee brewing machine in FIG. 2 with a filter basket and beverage tank assembly removed.

FIGS. 1 through 3 depict one example of a beverage brewing apparatus that incorporates this invention in the form of a coffee brewing machine 10 that includes a housing 11 adapted to stand on a counter or other horizontal support surface. A bottom housing portion 12 includes a drain assembly 13 with a sump for supporting a coffee cup and capturing any spills. A vertical side housing 14 contains an internal cavity for routing certain elements, such as a tube that carries cold water to a heater. A back housing panel 15 and the vertical side housing 14 support a water reservoir 16 with a housing lid 17 at the top of the coffee brewing machine 10. The housing 11 with its bottom housing portion 12, vertical side housing 14, back housing panel 15 and water reservoir 16 define a cavity 20. The cavity 20 receives a beverage tank assembly 21 with a handle 22 for facilitating the removal and insertion of the beverage tank assembly 21 from and into the cavity 20.

The water reservoir 16 also includes one set of brewing controls 23 on a front control panel 24 along with a display 25 which, in this embodiment, displays clock time. The brewing controls 23 are used in brewing multiple servings of coffee. Such controls are known to those of ordinary skill in the art.

In accordance with one aspect of this invention, after coffee is brewed an individual places a cup or mug on the drain assembly 13 under a dispensing spout assembly 26. Then the individual manually activates a dispensing control 27 on the control panel 24 to energize a dispensing pump assembly in the housing 11. So long as the dispensing pump assembly is energized and there is coffee in the beverage tank assembly 21, the coffee brewing machine 10 dispenses coffee through the spout assembly 26 into a cup.

FIG. 2 depicts the coffee brewing machine 10 of FIG. 1 with the housing lid 17 open to expose to view a brewing station 30 with a filter basket 31 covered by a water spreader lid 32, described later. As apparent from FIG. 2, the brewing station 30 is surrounded by and vertically coextensive with the water reservoir 16. This construction minimizes the overall height of the coffee brewing machine 10 by incorporating the functions of water storage and beverage brewing in the same vertical height section. Consequently, the coffee brewing machine 10 is more stable. Its reduced height also decreases the height required for storage.

During the brewing cycle, the water spreader lid 32 disperses hot water into the filter basket 31 to infuse the coffee grounds in the filter basket 31. FIG. 3 depicts the coffee brewing machine 10 with the water spreader lid 32 removed from the filter basket 31 and with the beverage tank assembly 21 removed from the cavity 20. Removing the water spreader lid 32 exposes to view a hot water outlet 33 that supplies hot water for brewing. Removing the beverage tank assembly 21 exposes to view a pedestal 34 formed on the bottom housing portion 12 that carries a support ring 35, a heat insulating washer 36 and a warming plate 37. These elements enable heat to transfer to the contents of the beverage tank assembly 21, but minimize the transfer of heat to surrounding portions of the pedestal 34.

Figure 4:
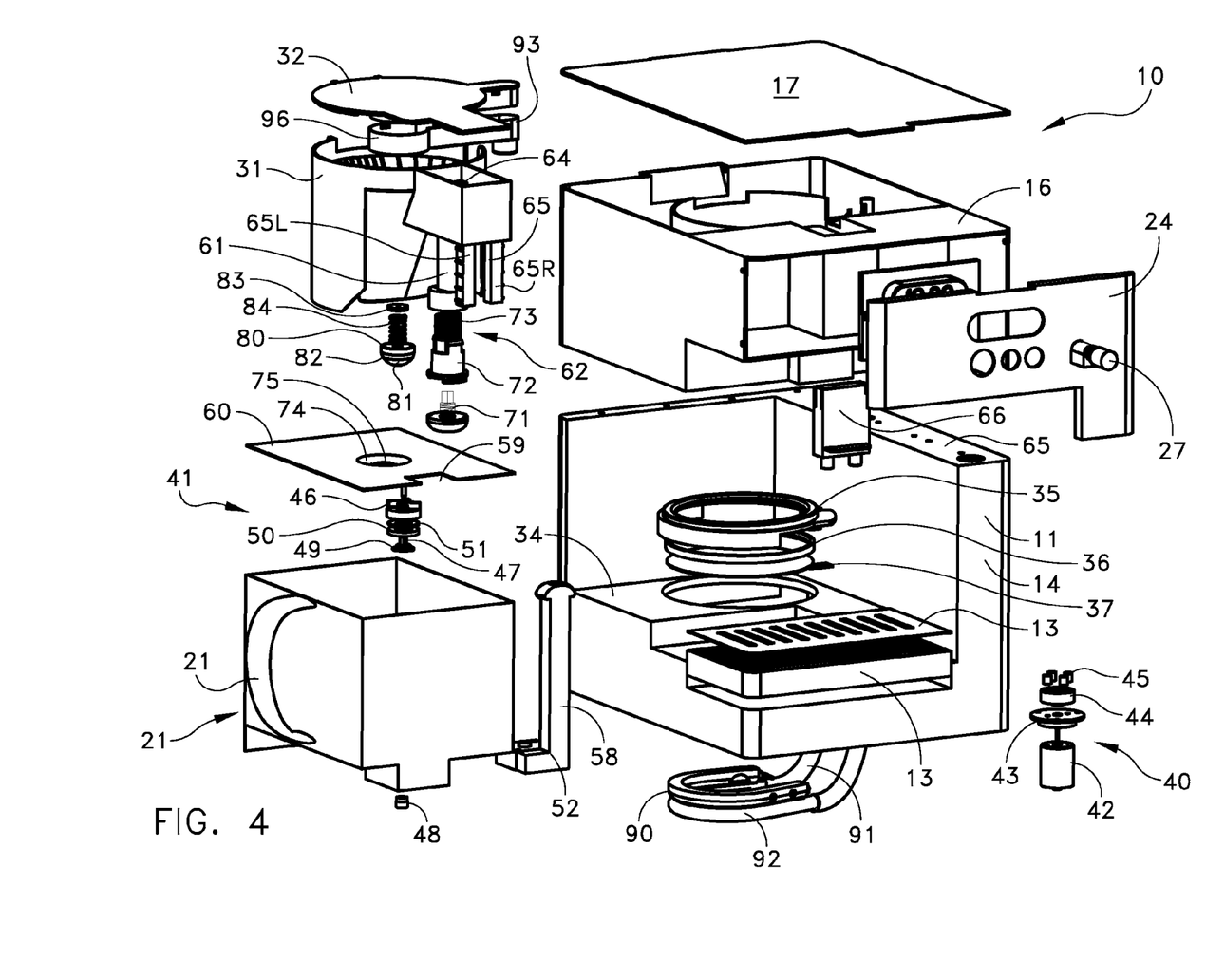
FIG. 4 is an exploded view of the coffee brewing machine of FIG. 1.
Figure 5:
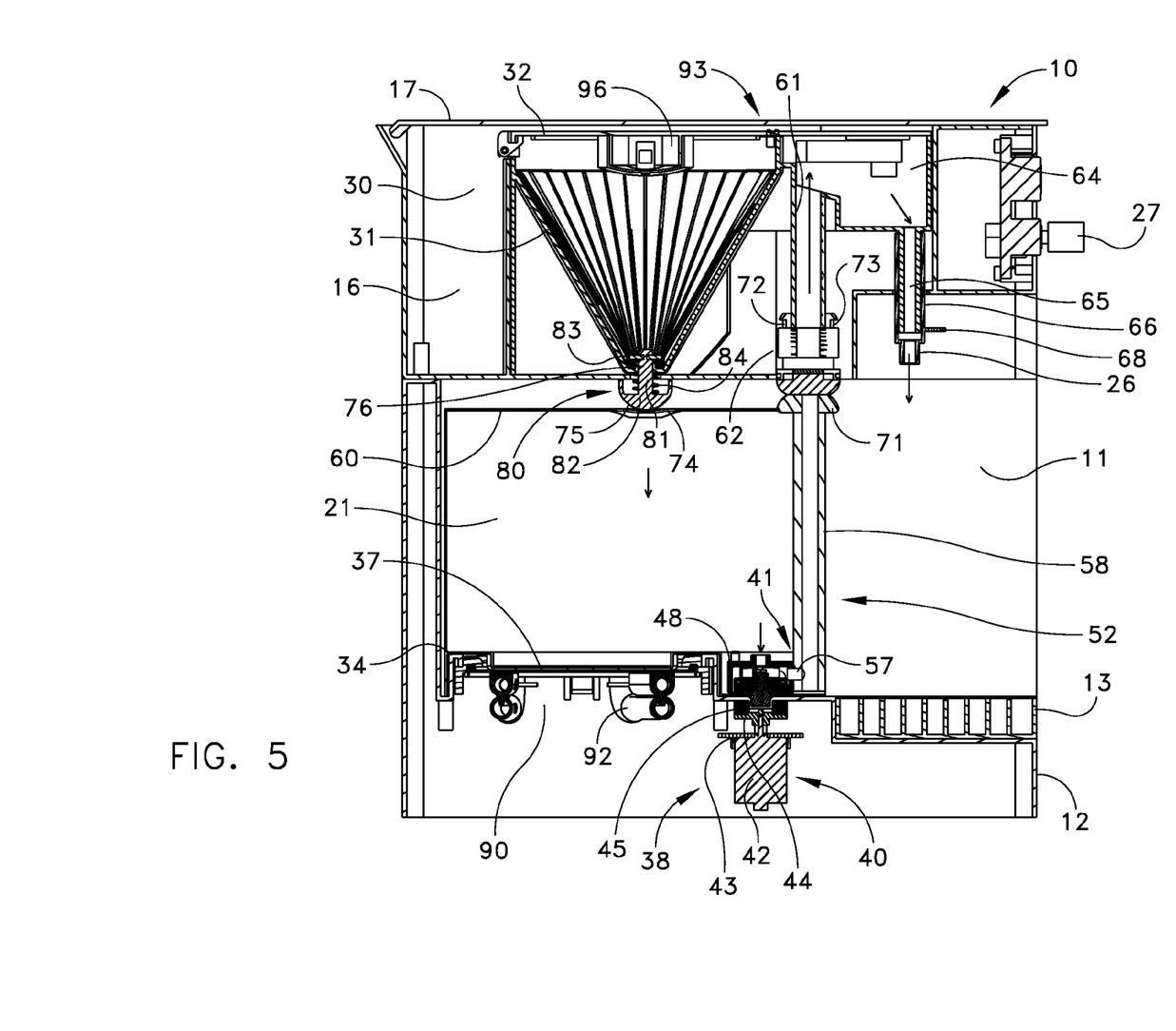
FIG. 5 is a sectional view taken along lines 5-5 in FIG. 1.

FIG. 4 is an exploded view that is useful in understanding the nature and relationship of the various components and assemblies that constitute this embodiment of the coffee brewing machine 10 and that provide the construction and operation that meets the several objects of this invention. For example, referring first to the transfer of brewed coffee accumulated in the beverage tank assembly 21 to the spout assembly 26, FIGS. 4, 5 and 6 depict a dispensing pump assembly 38 that includes a pump drive subassembly 40 mounted to the bottom housing portion 12 below the pedestal 34 and an impeller subassembly 41 mounted within the beverage tank assembly 21.

The pump drive subassembly 40 includes a pump motor 42. A bracket 43 attaches to the pump motor 42 and anchors the pump motor to the underside of the pedestal 34 in a manner that is not shown, but will be apparent to those of ordinary skill in the art. The pump motor 42 rotates a magnet support 44 that carries angularly spaced, alternately polarized permanent magnets 45. As this structure is mounted below the pedestal 34, the pump drive subassembly 40 does not contact brewed beverage in the beverage tank assembly 21. Therefore the pump drive subassembly 40 does not require regular cleaning.

As shown particularly in one or more of FIGS. 4 through 7, one end of the beverage tank assembly 21 receives the impeller subassembly 41. The impeller subassembly 41 includes a pump impeller 46 mounted on an impeller shaft 47 and is located in a well 48 at one end of the beverage tank assembly 21, A support bearing 49 fixed in the bottom of the well 48 carries the impeller shaft 47 and pump impeller 46 for rotation in the well 48. A support ring 50 on the impeller shaft 47 carries four angularly spaced, alternately polarized magnets 51. The materials of the pedestal 34 and the well 48 intermediate the pump drive subassembly 40 and the impeller subassembly 41 are formed of non-magnetic materials. High-temperature plastics are one example of such materials. Consequently as the magnets 45 in the pump drive assembly 40 rotate, the magnetic fields from the magnets 45 and 51 can interact to induce the impeller subassembly 41 to rotate.

Figure 6:
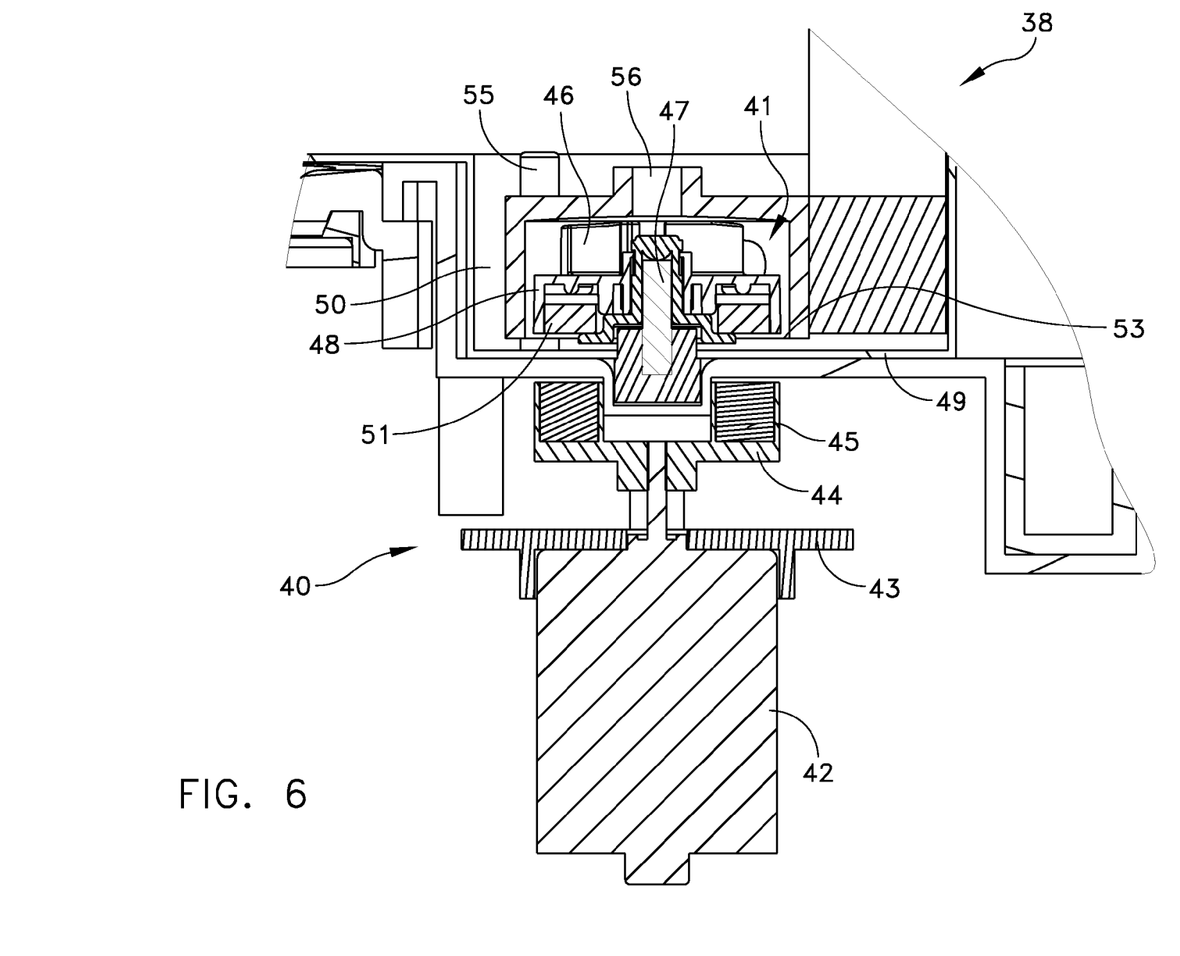
FIG. 6 is an enlarged detailed view of a pump assembly shown in FIG. 5.
Figure 7:
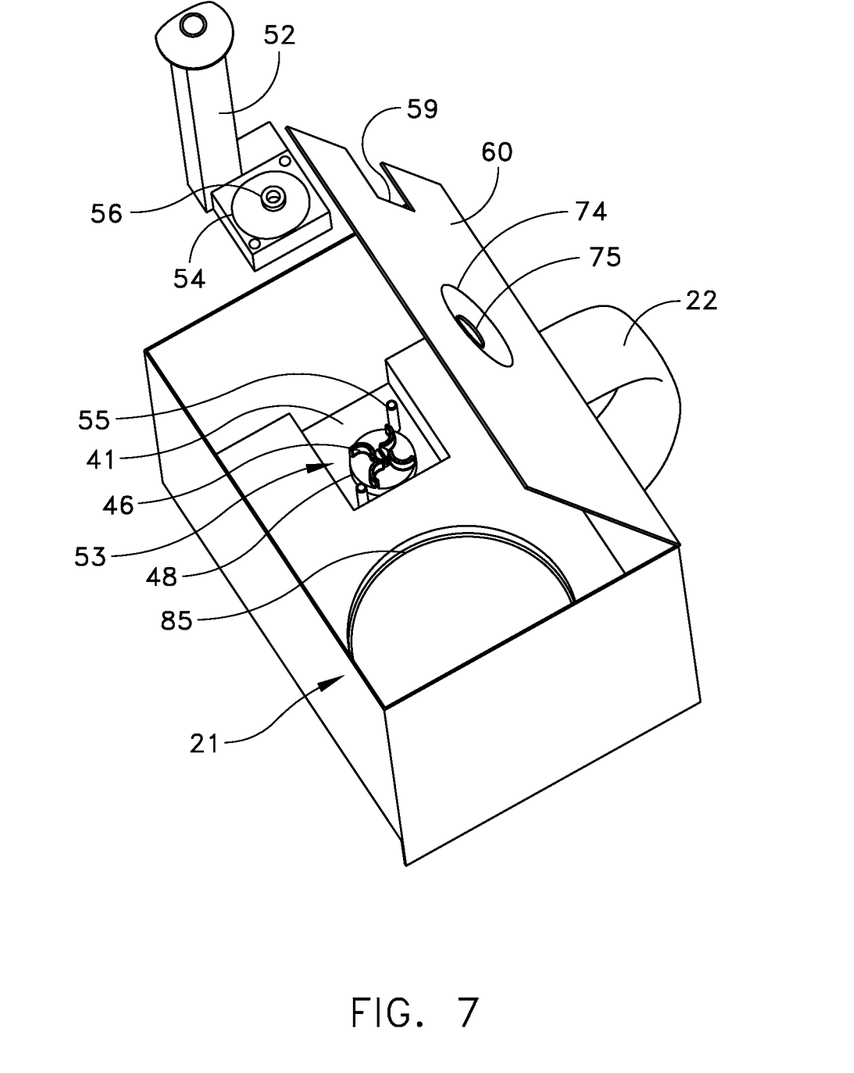
FIG. 7 is perspective view of a beverage tank assembly useful in the coffee brewing machine of FIG. 1.

As shown in FIGS. 6 and 7, the well 48 also receives a portion of a dispensing tube 52. More specifically, the well 48 includes a bottom portion 53 lying below the impeller subassembly 41. The dispensing tube 52 includes a base 54 with depending side walls. The base 54 slides into the well 48 and attaches to upstanding posts 55 thereby to form a pumping chamber with an outlet port 57.

As the beverage tank assembly 21 fills, the liquid passes through an inlet 57 formed in the base 54 to fill the pumping chamber in the well 48. Thus, when an individual activates the dispensing control 27 in FIGS. 1 through 3, the pump motor 42 in FIGS. 4 and 6 rotates the magnets 45 on the pump drive assembly 40. This causes the impeller subassembly 41 to rotate and to pump the beverage through an upstanding tube 58 of the dispensing tube 52. The upstanding tube 58 extends through a notch 59 in a beverage tank assembly lid 60 that is closed during normal operations. As shown in FIG. 5, during a dispensing operation, the pumped beverage passes from the upstanding tube 58 to another tube 61 through a sealing coupling 62. From the upstanding tube 61, the beverage transfers to a beverage output chamber 64 to be dispensed through the spout assembly 26.

Figure 8:
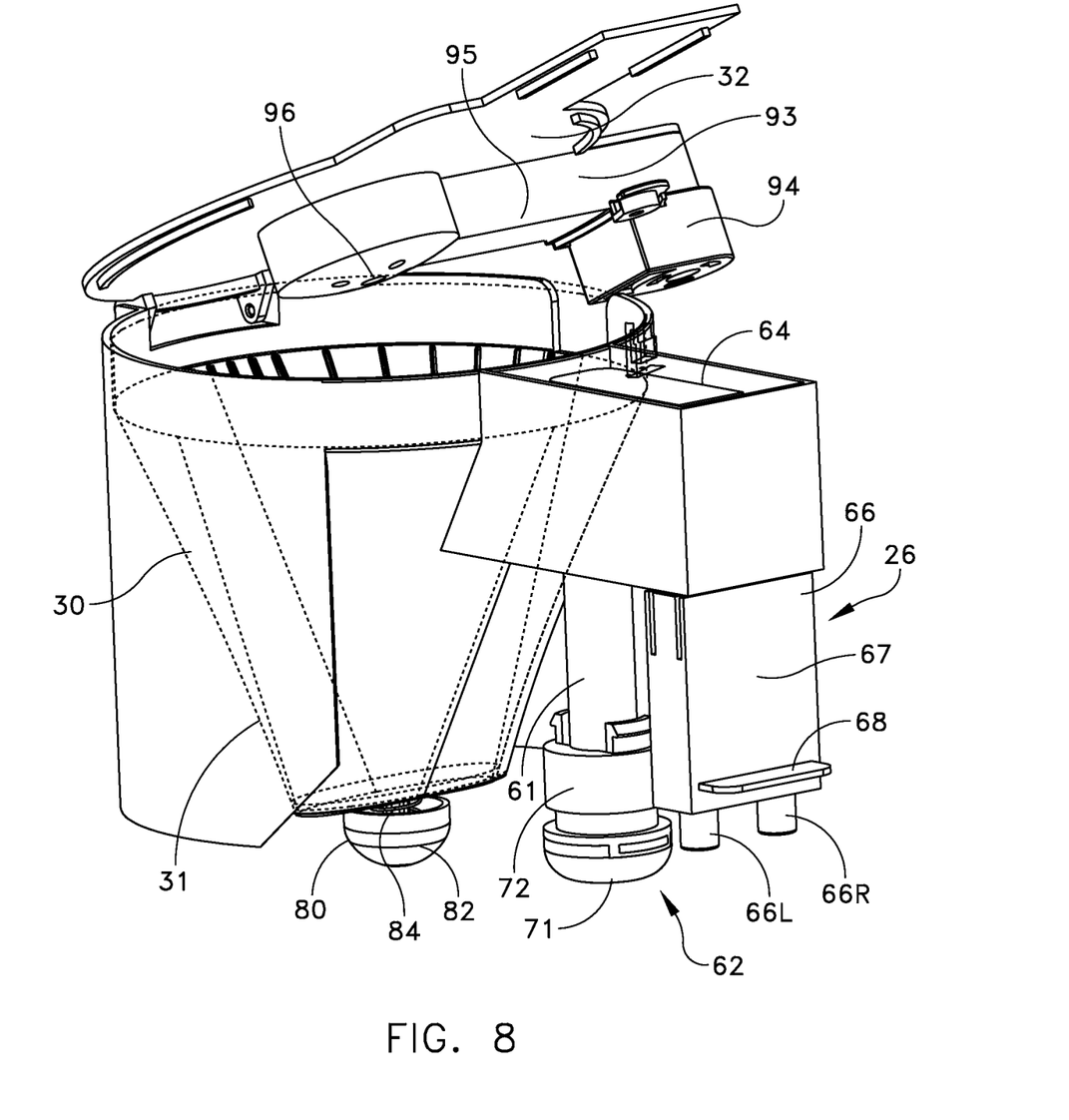
FIG. 8 is perspective view of a filter basket assembly useful in the coffee brewing machine of FIG. 1.

As more specifically shown in FIG. 8, the spout assembly 26 includes an inner spout unit 65 with left and right spouts 65L and 65R that depend from and are integral with the beverage outlet chamber 64. An outer spout unit 66 includes a sleeve 67 that slides over the spouts 65L and 65R. An adjustment tab 68 enables an individual to adjust the lower position of the outer spout 66. Two outlet ports 66L and 66R depend from the outer spout 66. Thus in accordance with one objective of this invention, the height between the outlet ports 66L and 66R and the drain assembly 13 can be adjusted to accommodate cups of different heights. In one specific embodiment, a coffee brewing machine 10 accommodates cups having a height from 7 cm. to 18 cm.

In this embodiment of the coffee brewing machine 10, the brewing station 30 and the beverage tank assembly 21 readily separate from the housing 11 to achieve the objective of easy cleaning. As will be apparent from FIG. 5, this requires that the relationship between the beverage tank assembly 21 and the brewing station 30 have two detachable liquid paths. The first is the path from the dispensing pump assembly 38 to the beverage output chamber 64. The second is the path from the brewing station 30 to the beverage tank assembly 21.

Referring to the first path and FIG. 5, in accordance another aspect of this invention, the sealing coupling 62 interconnects the tubes 58 and 61 and assures that there is no leakage when the systems are assembled. Specifically, the sealing coupling 62 includes a dome-shaped seal 71, a hook joint 72 and a spring 73. The dome-shaped seal 71 is formed as an accordion tube for expansion and contraction. Both the dome-shaped seal 71 and the spring 73 are positioned within the hook joint 72 that is mounted on the filter basket 31. Consequently the joint can move up and down as vertical pressure on the dome-shaped seal 71 changes. That is, the dome-shaped seal 71 rises when both the beverage tank assembly 21 and the brewing station 30 are in place. The spring 73 provides a sealing bias. Thus when the beverage tank assembly 21 is in place, the upper end of the dispensing tube 58 seals against the dome-shaped seal 71, but readily separates when it desired to remove either the brewing station 30 or the beverage tank assembly 21 or both for cleaning.

The second liquid path conveys liquid from the filter basket 31 to the beverage tank assembly 21 through a beverage tank cover 59. Looking at FIGS. 5, 7 and 8, the beverage tank cover 59 includes a dimpled portion 74 with a central aperture 75. The filter basket 31 in the brewing station 30 tapers inwardly to a filter basket outlet port 76 in the form of a bottom central opening. A brewing basket valve 80 acts as a drip stop assembly and controls the flow of beverage through the filter basket outlet port 76 and the central aperture 75 in the beverage tank assembly 21.

Referring to FIGS. 5 and 8, the brewing basket valve 80 includes a valve rod 81 that terminates in a bottom head portion 82 and an upper valve seal 83. A spring 84 biases the valve rod 81 downwardly to a position where the valve seal 83 closes the filter basket outlet port 76 at the bottom of the filter basket 31. When the beverage tank assembly 21 and the brewing station 30 are both in place, the beverage tank cover 58 raises the head portion 82 and opens the valve seal 83 so brewed beverage can pass through the filter basket outlet port 76. This structure provides a detachable liquid path that is open during normal use. However, the seal closes with removal of either the beverage tank assembly 21 or the brewing station 30. Consequently, the brewing basket valve 80 also facilities the separation of the beverage tank assembly 21 and the brewing station 30 from each other and the housing 11 for cleaning.

With the foregoing as background, other features and construction concepts of a coffee brewing machine can be understood by referring to FIGS. 3 through 5 and by describing the operation of the coffee brewing machine 10. First, an individual fills the water reservoir 16 and places an appropriate quantity of fresh coffee grounds in the filter basket 31 typically in a paper filter (not shown). In one embodiment the coffee brewing machine 10 has the capacity to brew 12 5-ounce servings of coffee. With the beverage tank assembly 21 and the brewing station 30 in place, the brewing controls 23 on the control panel 24 are set to brew a desired amount of coffee up to the maximum capacity. In response, cold water flows from the water reservoir 16 to a heater 90 through a cold water inlet tube 91. The heater 90 elevates the temperature of the water to exit as heated water through an outlet tube 92.

Hot water from an outlet tube 92 shown in FIGS. 4 and 5 flows through a water distribution assembly 93 mounted to the bottom of the water spreader lid 32. Referring to FIG. 8, the water distribution assembly 93 includes a nipple 94 for the outlet tube 92, a radial passage 95 and a shower head 96. This structure distributes hot water evenly over the coffee grounds to infuse the beverage. As the brewed beverage accumulates, it passes through the open brewing basket valve 80 into the beverage tank assembly 21 and particularly into the well 48. The heater 90 also provides a sufficient heat transfer through the conductive plate 37 and a conductive plate 85 in the bottom of the beverage tank assembly 21 to maintain the brewed beverage at an appropriate serving temperature.

Referring to FIG. 5, to dispense a cup of coffee as a single serving, an individual places a cup on the drain assembly 13 and uses the spout adjustment tab 68 to position the outer spout unit 66 at an appropriate position along the inner spout unit 65. Then the individual manipulates the dispensing control 27 shown in FIG. 1 to select an amount of beverage and to energize the pump motor 42 in the pump drive subassembly 40. The induced rotation at the impeller subassembly 41 pumps beverage up the dispensing tube 52 through the sealing coupling 62 and the tube 61 into the beverage outlet chamber 64 whereupon it flows down through the spout assembly 26 to exit into the cup. Interposing the beverage outlet chamber 64 between the tube 61 and the spout assembly 26 minimizes the risks of splashing coffee in the cup. Without the beverage outlet chamber 64 the coffee could exit the spout assembly 26 under pressure. The beverage outlet chamber 64 dissipates any pressure from pumping, so the brewed beverage merely drains from the spout assembly 26.

Manipulation of the dispensing control 27 can produce one of any number of operations. In a simple control system, the individual applies pressure to the dispensing control 27 until the desired quantity of coffee is in the cup. It has been found that the dispensing pump assembly discharges beverage at a rate that is proportional to pump speed. A control could be included that responds to the individual pressing the dispensing control 27 momentarily by energizing the pump motor 42 for an interval required to dispense a predetermined amount of coffee; e.g., 5 ounces as a single serving. A still more sophisticated control system could allow the individual to select a specific quantity and then dispense a corresponding amount by calculating the time required for dispensing that amount.

As will now be apparent, different embodiments of a beverage brewing apparatus constructed in accordance with this invention will meet some or all of the objectives of this invention. For example, the disclosed combination of the various components, subassemblies and assemblies permit the batch brewing of multiple beverage servings that accumulate in the beverage tank assembly 21. The beverage tank assembly 21, pump assembly 38, the dispensing control 27, dispensing tube 52, tube 61 and the beverage output chamber 64 allow a predetermined single-serving or multiple-serving quantity to fill a cup or other container through the spout assembly 26. This structure also eliminates the need for a carafe and the handling of that carafe by an individual. With certain control embodiments an individual can place a cup on the drain assembly 13, select a serving size and activate a button to fill a cup without further involvement in the process. Consequently, this invention permits the construction of a beverage brewing apparatus that is user friendly.

As will also be apparent, a beverage brewing system constructed in accordance with this invention will be compact and stable during use. It will allow a beverage to be dispensed into cups of different heights. Cleaning is simplified because all the components that contact the brewed beverage are readily removed for cleaning, even in a dishwasher. Specifically, it is easy to remove the beverage tank assembly 21 and remove the dispensing tube 62. Likewise it is easy to remove the brewing station 30 with the beverage output chamber 64 and tube 61. Further, as will be apparent to those of ordinary skill in the art, the construction and organization of this embodiment provide a beverage brewing apparatus that is economical to manufacture.

This invention has been disclosed in terms of certain embodiments. It will be apparent that many modifications can be made to the disclosed apparatus without departing from the invention. For example, the various components have been disclosed with specific configurations that can be varied. One specific pump assembly has been disclosed in which a pump drive subassembly is isolated from the beverage and uses a magnetically coupled transmission to rotate an impeller in the beverage. Other magnetic couplings could be substituted, such as rings with different poles could be used. A different number of magnets or magnetic poles could be used. Different sealing structures could be substituted for the sealing coupling and the brewing basket valve. The control of the brewing and dispensing process could be varied. In the disclosed embodiment a single heater heats the water and maintains the brewed beverage at an appropriate temperature. As an alternative, separate heaters could implement each function. Two particularly advantageous sealing structures are disclosed. However, other sealing structures could be substituted that perform essentially the same function with some or all of the benefits of the disclosed sealing structures. Various spout implementations could be substituted that provide some or all the advantages of the specifically disclosed spout assembly.

Therefore, it is the intent of the appended claims to cover all such variations and modifications as come within the true spirit and scope of this invention.

What is claimed as new and desired to be secured by Letters Patent of the United States is:

1. An apparatus for brewing and delivering hot beverage, said apparatus comprises:
   i. a housing;
   ii. a filter basket assembly mountable in said housing, wherein hot water infuses an extractable substance to produce a hot brewed beverage delivered through a filter basket outlet port;
   iii. a detachable beverage tank below said filter basket assembly for collecting the brewed beverage through said filter basket outlet port, said detachable beverage tank comprises an impeller at the inner bottom surface of the beverage tank, said impeller comprises a first set of magnets and rotation of said impeller will drive the hot beverage into an upstanding tube, said upstanding tube is disposed inside of the beverage tank and runs from the bottom of the beverage tank to the top of the beverage tank in order to pass the beverage to a dispensing spout located adjacent to the filter basket assembly, said dispensing spout directs the beverage downwards to a receiving vessel, wherein the beverage travels from said filter basket assembly to said beverage tank through said filter basket outlet port and is driven into said upstanding tube to reach said dispensing spout; and
   iv. a motor located below the detachable beverage tank, said motor comprises a magnet support carrying a second set of magnets outside the detachable beverage tank, wherein said magnet support is located below the impeller in the beverage tank, wherein said impeller is induced to rotate via magnetic interaction between the first and second sets of magnets when the magnet support is rotated by the motor.

2. The apparatus of claim 1, wherein said filter basket assembly includes a drip stop assembly at the filter basket outlet port that contacts said beverage tank assembly.

3. The apparatus of claim 2, wherein said drip stop assembly comprises:
   i. a valve seal for closing said filter basket outlet port,
   ii. a valve rod having a head connected to said valve seal, and
   iii. a spring for biasing said valve rod and seal to close said outlet port whereby said head engages said beverage tank to open said drip stop assembly.

4. The apparatus of claim 1, further comprises a beverage output chamber to collect the hot beverage before passing the beverage to said dispensing spout.

5. The apparatus of claim 1, wherein said housing comprises a bottom housing portion for supporting a cup under said dispensing spout.

6. The apparatus of claim 5, wherein said bottom housing portion comprises a drain assembly.

7. The apparatus of claim 1, wherein said dispensing spout further comprises an adjustable unit for varying the length of said dispensing spout.

8. The apparatus of claim 1, wherein rotation of said motor is controlled by a manually activated dispensing control.

9. The apparatus of claim 1, wherein said impeller comprises an impeller ring and the first set of magnets are angularly spaced on said impeller ring.

10. The apparatus of claim 1, wherein said second set of magnets are angularly spaced on the magnet support.

11. The apparatus of claim 1, wherein said motor is controlled to rotate for a time interval required to dispense a predetermined amount of hot beverage.

\* \* \* \* \*